US012384436B2

United States Patent
Young et al.

(10) Patent No.: US 12,384,436 B2
(45) Date of Patent: Aug. 12, 2025

(54) DEVICE AND METHOD FOR DETECTING AN OBSTRUCTION OF A RAILROAD CROSSING GATE

(71) Applicant: Siemens Mobility, Inc., New York, NY (US)

(72) Inventors: Paul Young, Louisville, KY (US); Nathan Fletcher, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 578 days.

(21) Appl. No.: 17/820,974

(22) Filed: Aug. 19, 2022

(65) Prior Publication Data

US 2024/0059331 A1    Feb. 22, 2024

(51) Int. Cl.
| | | |
|---|---|---|
| *B61L 29/22* | (2006.01) | |
| *B61L 23/00* | (2006.01) | |
| *B61L 29/04* | (2006.01) | |
| *H02P 23/14* | (2006.01) | |
| *H02P 25/03* | (2016.01) | |

(52) U.S. Cl.
CPC ............. *B61L 29/22* (2013.01); *B61L 23/007* (2013.01); *B61L 29/04* (2013.01); *H02P 23/14* (2013.01); *H02P 25/03* (2016.02)

(58) Field of Classification Search
CPC ........ B61L 29/04; B61L 29/22; B61L 23/007; H02P 25/03; H02P 23/14
See application file for complete search history.

(56) References Cited

U.S. PATENT DOCUMENTS

| | | |
|---|---|---|
| 6,307,339 B1 | 10/2001 | Yourist et al. |
| 2007/0130834 A1 | 6/2007 | Kande et al. |
| 2017/0217463 A1 | 8/2017 | DeJarnatt et al. |

FOREIGN PATENT DOCUMENTS

GB        2519497 A  *  4/2015  ............... A01K 1/00

* cited by examiner

*Primary Examiner* — Robert J McCarry, Jr.

(57) ABSTRACT

A crossing gate mechanism includes an electric motor with one or more sensor(s), a crossing gate arm operated via the electric motor, and a controller configured to control the electric motor to raise or lower the crossing gate arm in response to a gate control signal. The controller is further configured to sense a motion of the crossing gate arm and detect an obstruction that prevents the crossing gate arm to execute the motion. Further, an associated method and non-transitory computer readable medium are described.

15 Claims, 4 Drawing Sheets

DEVICE AND METHOD FOR DETECTING AN OBSTRUCTION OF A RAILROAD CROSSING GATE

BACKGROUND

1. Field

Aspects of the present disclosure generally relate to railroad crossing gates and more particularly, to a device and method for detecting an obstruction of a railroad crossing gate.

2. Description of the Related Art

Railroad crossing gates, which typically are raised by default and lowered when a train approaches and crosses an intersection of a road and railroad track (i.e., a crossing, also referred to as level crossing), are provided for roadway and pedestrian safety. In some instances, there may be separate gates for the roadway and the pedestrian path. For public safety reasons, it is essential that these crossing gates operate correctly.

Typically, railroad crossing gates utilize electrical and mechanical components to ensure that the gates perform their intended functions correctly. For example, gate arms are lowered using a motor located in a gate control mechanism. A crossing gate mechanism may be described as a gate control box housing multiple electric and electronic components for operating and controlling the signal control equipment and warning devices, such as the crossing gates. Typically, the gate control box includes a housing with a cover or door, so that the control box may be opened for maintenance or other services. The same mechanism uses or is connected to counterweights to counterbalance the gate arms during movement of the arms.

In some cases, a gate arm may be obstructed so that the arm cannot reach a complete gate-up or gate-down position. Without detecting this obstruction, control logic of the crossing gate mechanism may continue to force the arm until an over-current condition occurs. By that time, the gate arm could bend or break, or other components in the gate mechanism could be overstressed or damaged. Thus, an improved gate control mechanism is desirable.

SUMMARY

Briefly described, one or more embodiments of the present disclosure provide for a gate crossing mechanism, including techniques for controlling a gate crossing motor and determining or detecting characteristics, such as position, direction of motion, of a crossing gate arm associated with the gate crossing motor.

A first aspect of the present disclosure provides a crossing gate mechanism comprising an electric motor with at least one sensing device, a crossing gate arm operated via the electric motor, a controller configured to control the electric motor to raise or lower the crossing gate arm in response to a gate control signal, wherein the controller is further configured to sense a motion of the crossing gate arm, and detect an obstruction that prevents the crossing gate arm to execute the motion.

A second aspect of the present disclosure provides a method for detecting an obstruction of a railroad crossing gate, the method comprising initiating a defined motion of a crossing gate arm of a railroad crossing gate, the crossing gate arm being operated via an electric motor, sensing the defined motion of the crossing gate arm, and detecting an obstruction of the crossing gate arm when the crossing gate arm fails to execute the defined motion.

DETAILED DESCRIPTION

To facilitate an understanding of embodiments, principles, and features of the present disclosure, they are explained hereinafter with reference to implementation in illustrative embodiments. In particular, they are described in the context of methods and systems for detecting and controlling a gate arm position of a railroad crossing gate mechanism.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A gate crossing mechanism protects motorists, pedestrians, and the like from oncoming trains by blocking level crossings or points at which public or private roads cross railway lines at the same level. As one example, a gate crossing mechanism can include an arm or "gate" that, using a motor, selectively lowers/raises depending upon whether a train or other vehicle is passing through the level crossing. For example, if a train is approaching a level crossing, a gate can be lowered to prevent traffic on the road or path from crossing the railway line. A level crossing can be equipped with multiple gate crossing mechanisms. For example, each side of the railway line can include a gate crossing mechanism. In larger intersections, each side of the railway line can include two (or more) gate crossing mechanisms. Gate crossing mechanisms can further include lights, sirens, bells, or other similar devices that can provide visual and/or aural warnings.

Conventional gate crossing mechanisms can be susceptible to failures, malfunctions, etc., which can reduce their reliability to control a level crossing safely. It is, therefore, desirable to improve efficiency and reliability of conventional gate crossing mechanisms. Gate crossing mechanisms having the features and functionality described herein improve efficiency and address problems associated with conventional gate crossing mechanisms.

Figure 1:
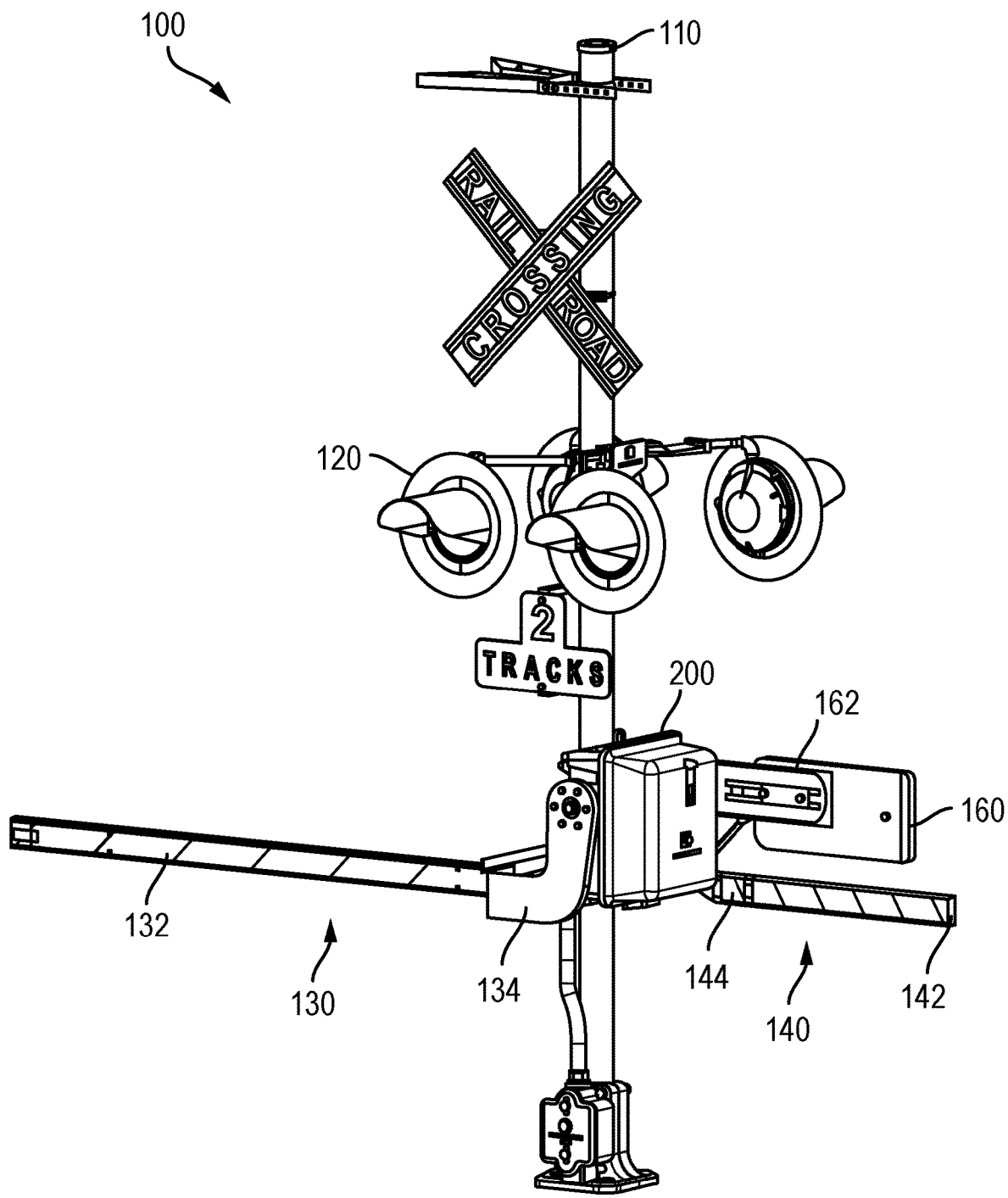
FIG. 1 illustrates an example railroad crossing gate in accordance with an exemplary embodiment of the present disclosure.

FIG. 1 illustrates a railroad crossing gate 100 in a lowered or horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 130 and pedestrian gate 140. The roadway gate 130 and pedestrian gate 140 may be raised and lowered, i.e. operated, by gate control mechanism 200.

The example railroad crossing gate 100 also includes a pole 110 and signal lights 120. The gate control mechanism 200 is attached to the pole 110 and is used to raise and lower the roadway and pedestrian gates 130, 140. The illustrated railroad crossing gate 100 is often referred to as a combined crossing gate. When a train approaches the crossing, the railroad crossing gate 100 may provide a visual warning using the signal lights 120. The gate control mechanism 200 will lower the roadway gate 130 and the pedestrian gate 140 to respectively restrict traffic and pedestrians from crossing the track until the train has passed.

As shown in FIG. 1, the roadway gate 130 comprises a roadway gate support arm 134 that attaches a roadway gate arm 132 to the gate control mechanism 200. Similarly, the pedestrian gate 140 comprises a pedestrian gate support arm 144 connecting a pedestrian gate arm 142 to the gate control mechanism 200. When raised, the gates 130 and 140 are positioned so that they do not interfere with either roadway or pedestrian traffic. This position is often referred to as the vertical position. A counterweight 160 is connected to a counterweight support arm 162 connected to the gate control mechanism 200 to counterbalance the roadway gate arm 132. Although not shown, a long counterweight support arm could be provided in place of the short counterweight support arm 134.

Typically, the gates 130, 140 are lowered from the vertical position using an electric motor contained within the gate control mechanism 200. The electric motor drives gearing connected to shafts (not shown) connected to the roadway gate support arm 134 and pedestrian gate support arm 144. The support arms 134, 144 are usually driven part of the way down by the motor (e.g., somewhere between 70 and 45 degrees) and then gravity and momentum are allowed to bring the arms 132, 142 and the support arms 134, 144 to the horizontal position. In another example, the support arms 134, 144 are driven all the way down to the horizontal position by the electric motor of the gate control mechanism 200.

Figure 2:
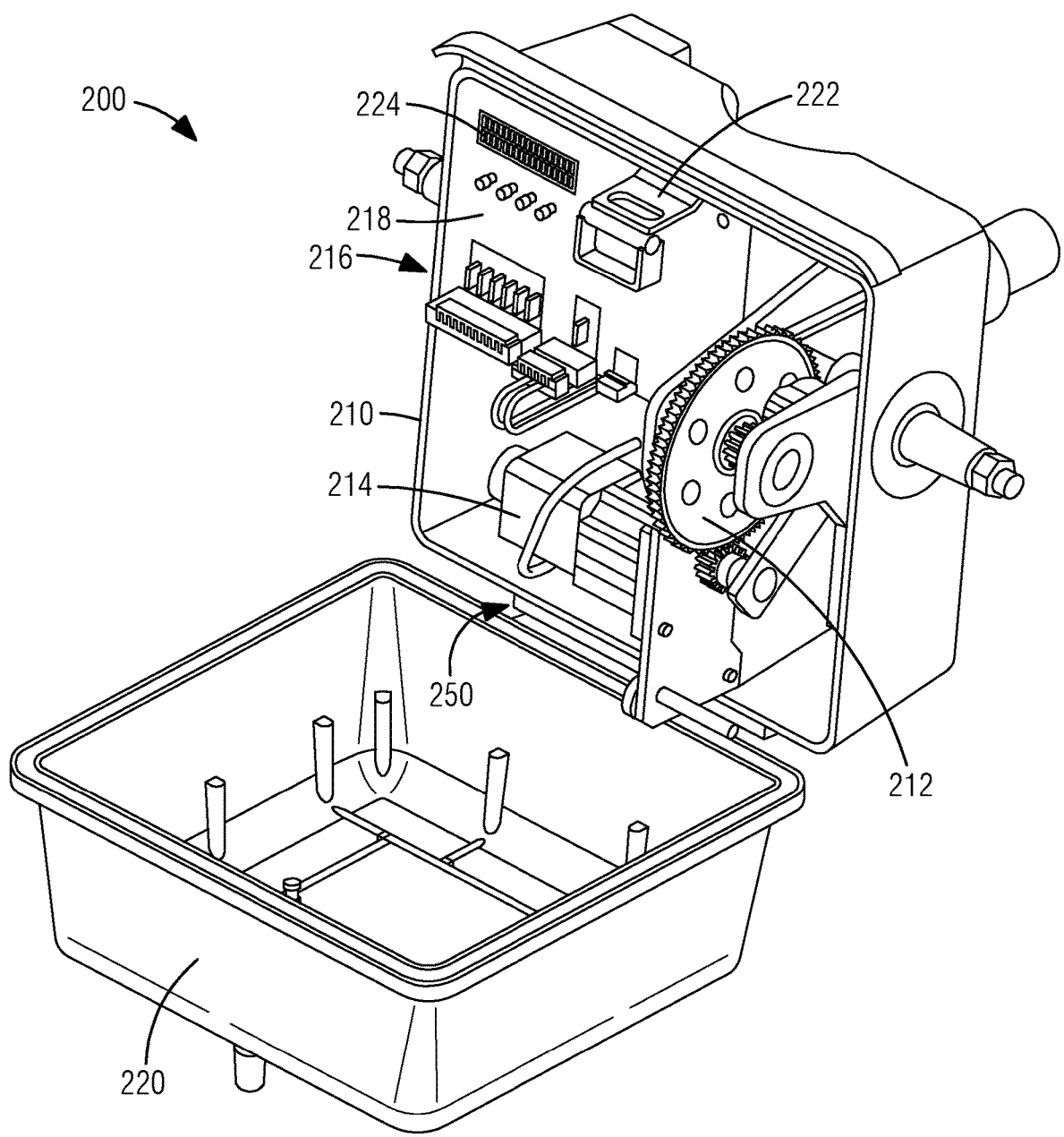
FIG. 2 illustrates a perspective view of a crossing gate mechanism in accordance with an exemplary embodiment of the present disclosure.

FIG. 2 illustrates a perspective view of crossing gate mechanism 200 in accordance with an exemplary embodiment of the present disclosure.

The crossing gate mechanism 200 comprises an enclosure 210 housing multiple electric and electronic components, such as for example gearing 212, electric motor 214 driving the gearing 212, and control unit 216. The control unit 216 comprises a printed circuit board (PCB) 218 with the necessary electronics for operating and controlling the gate mechanism 200 and associated crossing gate equipment, such as crossing gate arm(s), see for example FIG. 1. Further, the PCB 218 comprises for example display(s) and/or light emitting diodes (LEDs) 224, used for example to indicate or display status of the gate mechanism 200, such status including for example 'Power on', 'Gate Control', 'Brake On', 'Health' etc.

The enclosure 210 can be opened and closed via door or cover 220, for maintenance, repair, or other services. The cover 220 is moveable between a closed position and an open position, wherein FIG. 2 shows the cover 220 in the open position. The cover 220 is closed via hinge 250 and latch plate 222 in connection with a latch rod (not shown).

Figure 3:
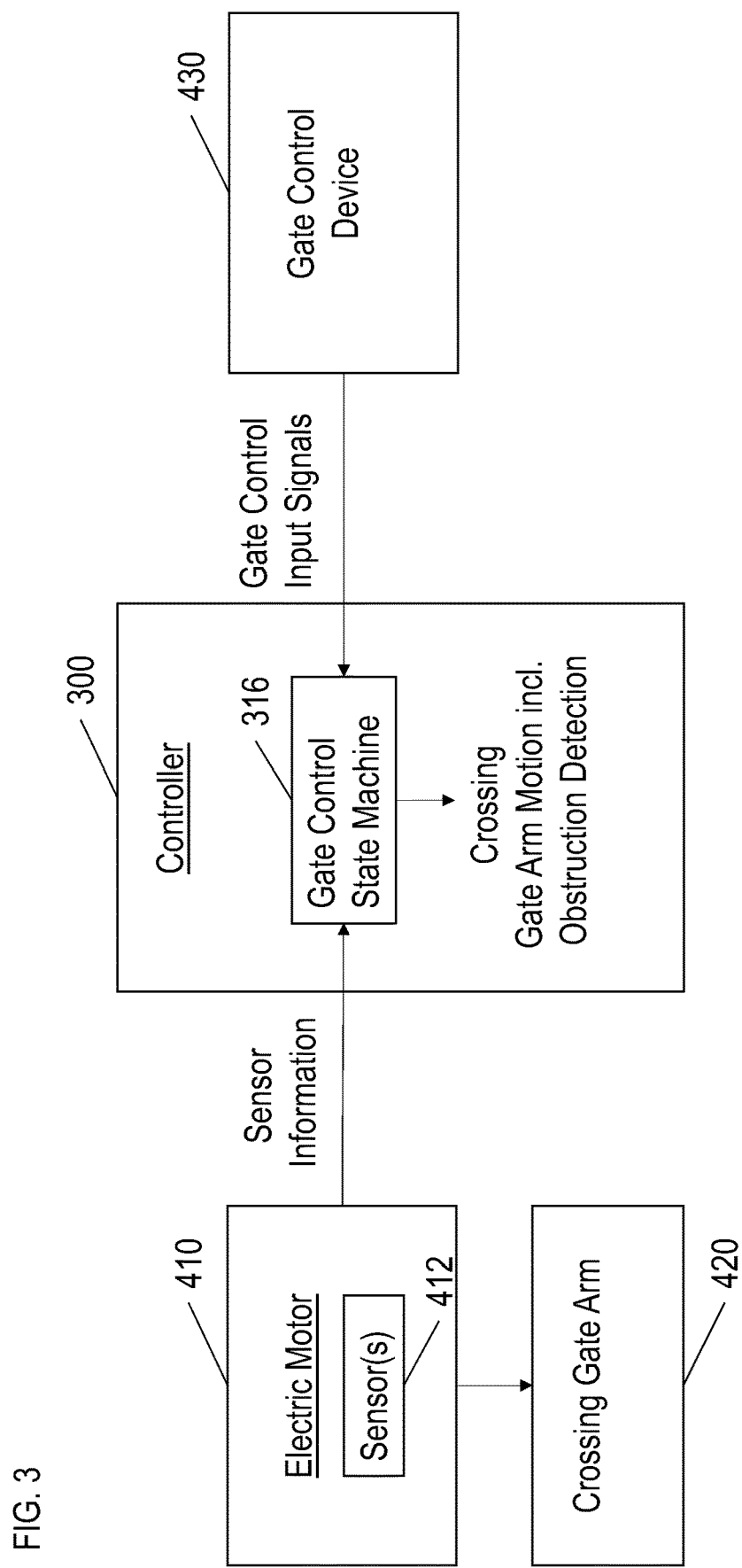
FIG. 3 illustrates a simplified block diagram of crossing gate mechanism in accordance with an exemplary embodiment of the present disclosure.

FIG. 3 illustrates a simplified block diagram of crossing gate mechanism in accordance with an exemplary embodiment of the present disclosure.

As noted earlier, in some cases, a gate arm may be obstructed so that the arm cannot reach a complete gate-up or gate-down position. Without detecting this obstruction, control logic of the crossing gate mechanism may continue to force the arm until an over-current condition occurs. By that time, the gate arm could bend or break, or other components in the gate mechanism could be overstressed or damaged.

Such an obstruction can be for example a vehicle stuck on the railroad crossing (intersection) and the gate arm 420 not being able to lower to the horizontal gate-down position. In other cases, the gate arm 420 can get stuck in the vertical gate-up position due to environmental factors, such as high winds, ice build-up, fallen branch or other plant material, etc. This could prevent the gate mechanism from reaching a safe state, i.e. gate lowered to the closed position to prevent traffic from entering intersection. In yet other cases, a gate arm could be obstructed from moving to the vertical position as well, i.e. by a branch or other natural object, ice build-up, a human etc.

In accordance with an exemplary embodiment of the present disclosure, the crossing gate mechanism comprises an electric motor 410 with at least one sensing device 412, a crossing gate arm 420 operated via the electric motor 410 and a controller 300, with at least one processor and control logic. The controller 300 is configured to control the electric motor 410 to raise or lower the crossing gate arm 420 in response to a gate control input signal, provided for example by a gate control device 430. The gate control device 430 provides gate control input signals, and can be for example a grade crossing controller, constant warning time device or other type of control equipment arranged wayside adjacent to a railroad track, for example in a crossing bungalow. When a gate control input signal is high, the gate arm 420 is being commanded to go up until it has reached a programmed, near-vertical gate-up position. When the gate control input signal is low, the gate arm 420 is being commanded to go down until it has reached a fixed, horizontal gate-down position.

The controller 300 is further configured to sense a motion of the crossing gate arm 420, based on sensor information received from the at least one sensor 412 of the electric motor 410, and to detect an obstruction that prevents the crossing gate arm 420 to execute the motion. Specifically, a gate control state machine 316 included in the controller 300 is configured to determine an actual motion of the crossing gate arm 420, for example based on position and direction of motion of the gate arm 420, and to detect an obstruction of the crossing gate arm 420.

The controller 300, e.g. gate control state machine 316, is configured to sense the motion of the crossing gate arm 420 based on sensor information provided by the at least one sensing device 412 on the electric motor 410. The sensor information includes position and direction of motion, wherein speed/velocity can be calculated based on position and direction of the gate arm 420 operated by the electric motor 410.

For example, the motion of the crossing gate arm 420 includes a defined velocity, i.e. direction and speed, and wherein an obstruction determination is based on a change in the defined velocity during the motion of the crossing gate arm 420. In other words, when the crossing gate arm 420 does not execute the defined motion/velocity in accordance with the gate control input signals (raise or lower), the gate control state machine 316 determines that there is an obstruction preventing/hindering the gate arm 420 to go up or down as commanded.

By sensing that the gate arm 420 has stopped moving, or even worse, has reversed direction, when the controller 300 (control logic, firmware) has delivered an elevated command, compared to the expected command, to move the arm up or down, the controller 300 can quickly determine that an obstruction has been encountered. Such an obstruction may be temporary and may be recoverable by control logic within the firmware of the controller 300. In an example, the controller 300 may consider a command an elevated command when the command is in the upper half of the respective command range.

In an embodiment, when the crossing gate arm 420 does not execute the motion as commanded, the gate control state machine 316 is configured to attempt to move the gate arm 420 to its desired position. If the gate arm 420 continues to fail to execute the motion and does not reach the desired/intended position (gate-up or gate-down), then an error code can be generated by the gate control state machine 316. The gate arm 420 may have multiple chances to complete the motion. After those multiple chances, the controller 300 determines an obstruction to the gate arm 420.

By utilizing sensing information of sensor(s) 412 of the electric motor 410 that is operating the gate arm 420, hardware of the controller 300 does not have to reach its thermal or electrical design limits (for example over-current condition) to determine that an obstruction has been encountered. Rather, the motion of the gate arm 420 is sensed by the sensor(s) 412 on the electric motor 410. This provides a responsive method for knowing when the gate arm 420 has stopped moving or has reversed direction. Command(s) to rotate the electric motor 410 and thereby move the gate arm 420 is provided and controlled by the same controller 300, and as a result the controller 300 can responsively determine that an obstruction has been encountered when a command has reached an elevated level and the gate arm motion has either ceased or reversed direction.

Figure 4:
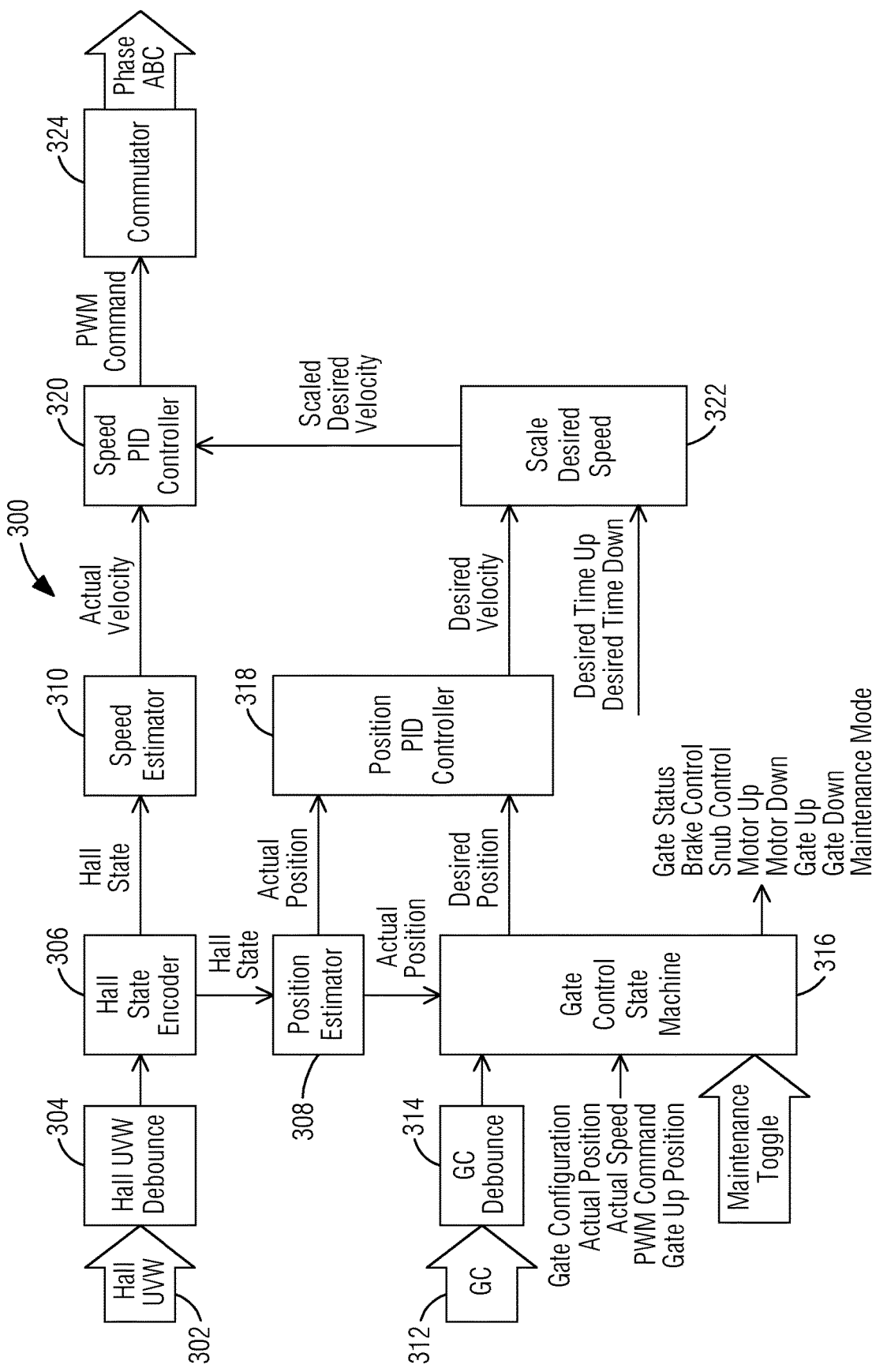
FIG. 4 illustrates a block diagram of a controller firmware design, including flow chart, in accordance with an exemplary embodiment of the present disclosure.

FIG. 4 illustrates a block diagram of a motor controller firmware design, including flow chart, of the controller 300 of FIG. 3 in accordance with an exemplary embodiment of the present disclosure. For example, with reference to FIG. 1 and FIG. 2, the controller 300 can be utilized within control unit 216 of gate mechanism 200 for controlling electric motor 214 to raise or lower gate arms 132, 142.

In an example, the motor controller, or simply controller 300, is implemented as a field-programmable gate array (FPGA), which is selected for its real-time responsiveness and ability to handle multiple activities at once. In other examples, the controller 300 is designed or implemented in a real-time central processing unit (CPU), an application-specific integrated circuit (ASIC), a complex programmable logic device (CPLD) or a system-on-chip (SoC). In case of a SoC, the SoC comprises a CPU and an FPGA.

In an embodiment, the electric motor 410 (see FIG. 3), controlled and/or operated by the controller 300 is an electric brushless direct current motor, herein referred to as BLDC motor, with at least one sensing device. The at least one sensing device comprises one or more Hall effect sensor(s). For example, the electric BLDC motor can be a 10-pole BLDC motor with three (3) Hall effect sensors. However, it should be noted that the electric motor 410 may be another type of electric motor, such as a brushed DC motor or other type of DC- or AC-motor. Further, the at least one sensing device may be another type of sensor(s) that can detect position and direction (speed) of the electric motor.

In an exemplary embodiment of the present disclosure and with reference to FIG. 4, Hall UVW 302 are Hall effect sensor input signals received from the BLDC motor, specifically the Hall effect sensors installed in the BLDC motor. The Hall UVW 302 sensor input signals are debounced, by Hall UVW Debounce 304, to minimize extraneous edge detections.

A Hall State Encoder 306 determines a current Hall state as well as a motor direction of the BLDC motor. In an example, the Hall effect sensor input signals are received as a sequence represented by vector <U V W>, where U is the most significant bit and W is the least significant bit. The sequence(s) is encoded into Hall states. When Hall states are received in a first order, the Hall State Encoder 306 indicates that the BLDC motor is turning in a forward direction, which for Position Estimator 308 results in an actual position of the gate arm, measured in Hall-state units, counting upward. When Hall states are received in a second order, then the Hall State Encoder 306 indicates that the BLDC motor is turning in a reverse direction, which for the Position Estimator 308 results in the actual position of the gate arm, measured in Hall-state units, counting downward.

Further, the Hall states are also used by a commutation block, see Commutator 324, to determine a correct firing sequence for motor phases A, B and C of the BLDC motor.

As noted, the Position Estimator 308 determines the actual position of the gate arm by counting the number of Hall states that have been received from the Hall State Encoder 306. A Hall state received in a forward direction, results in the actual position being incremented by one; a Hall state received in a reverse direction, results in the actual position being decremented by one. Forward and reverse directions are determined by the Hall State Encoder 306. When the gate arm is moving up, the actual position is counting up in a forward direction; when the gate arm is moving down, the actual position is counting down in a reverse direction. For an entrance gate, each time the arm reaches the bottom, unless an obstruction in the downward direction has been encountered, the actual position is reset to avoid accumulating any positional error.

An actual speed generated by Speed Estimator 310 is a count of the number of Hall states that have been sent by the Hall Sate Encoder 306 during a sampling window in a given direction, multiplied by a scaling factor that converts the count to motor revolutions per second (RPS).

Gate Control, referred to as GC 312, comprises and provides gate control input signals, received from a grade crossing controller, constant warning time device or other type of control equipment arranged wayside adjacent to a railroad track, for example in a crossing bungalow. When GC 312 is high, the gate arm is being commanded to go up until it has reached a programmed, near-vertical gate-up position. When GC 312 is low, the gate arm is being commanded to go down until it has reached a fixed, horizontal gate-down position. The input signal from GC 312 is debounced, by GC Debounce 314, to minimize extraneous edge detections.

Gate Control State Machine 316 receives a debounced GC input signal to determine a proper motion of the gate arm. The Gate Control State Machine 316 determines or decides whether the gate arm needs to move up, move down or stop moving to achieve a desired position for the gate arm. The Gate Control State Machine 316 also manages states of multiple outputs, including motor brake and motor snub circuit.

A Position PID (proportional-integral-derivative) Controller 318 compares the actual position, provided by Position Estimator 308, to the desired position, provided by the Gate Control State Machine 316, of the gate arm and outputs a desired speed/velocity. A scaling factor can also be applied to the desired speed to slow down or speed up the arm movement.

A Speed PID (proportional-integral-derivative) Controller 320 compares the actual speed to the desired speed of the gate arm and outputs a PWM (pulse width modulation) command. In an example, the Position PID Controller 318 uses a PID control loop to meet a desired position by outputting a desired velocity to the Speed PID Controller 320.

A Scale Desired Speed logic 322 multiplies the desired speed/velocity by an ascent or descent speed scale factor, depending on whether the gate arm is moving up or moving down, respectively. The ascent or descent speed scale factors are initialized by a processor of the gate control mechanism and automatically adjusted within a constrained range to better meet the desired up time or desired down time, as programmed by the processor into the controller 300.

The Speed PID Controller 320 uses for example a PID control loop to meet a scaled desired velocity by outputting a PWM command to the Commutator 324. The PWM command from the Speed PID Controller 320 is converted into a motor direction and PWM duty cycle, which the Commutator 324 uses, along with the encoded Hall state, to activate half-bridge field effect transistor(s) (FETs) that deliver current to a sequence of motor winding phases, such as phases A, B, C. To cause the BLDC motor to spin, the three motor winding phases A, B and C are energized by the Commutator 324 in a rotating sequence. The Hall state(s) from the Hall State Encoder 306 indicate(s) the current motor position, based on which corresponding windings are energized. The Commutator 324 can further be configured to provide reverse commutation to spin the BLDC motor in an opposite direction, thus causing the gate arm to move both up and down.

In an embodiment, a method for driving or operating the BLDC motor is a complementary pulse width modulation (PWM) using six independently controlled FETs (a high and low FET for each motor phase). As each phase A, B, C is being driven the high and low side FETs will be driven inversely, with a guaranteed "dead time" where neither the high FET nor the low FET is driven.

In an application and embodiment, the controller 300 and an associated method can be implemented for detecting an obstruction of a railroad crossing gate arm, as described with reference to FIG. 3.

Because the controller 300 includes the Position PID Controller 318 and the Speed PID Controller 320, and the desired position and desired speed of the gate arm are under PID control, the Gate Control State Machine 316 is configured, e.g. programmed, such that it can determine when an obstruction of gate arm has occurred. For example, by comparing the desired position to an actual position and a desired speed to an actual speed of the gate arm (utilizing Position PID Controller 318 and Speed PID controller 320), the Gate Control State Machine 316 can determine an obstruction/hindrance of the gate arm, based on discrepancies of position/speed and direction of motion.

Further, a method for detecting an obstruction of a railroad crossing gate in accordance with embodiments of the present disclosure is described. For example, the method may be performed utilizing a crossing gate mechanism with a controller 300 as described with reference to FIG. 3 and FIG. 4.

Generally, the method comprises initiating a defined motion of a crossing gate arm of a railroad crossing gate, the crossing gate arm being operated via an electric motor, sensing the defined motion of the crossing gate arm, and detecting an obstruction of the crossing gate arm when the crossing gate arm fails to execute the defined motion. The defined motion includes direction and speed/velocity of the crossing gate arm. In embodiments, determining the obstruction includes determining a change in the direction and/or a change in the speed or velocity. To determine the change in direction and/or speed/velocity, the method further comprises receiving sensor information from at least one sensing device of the electric motor.

In another embodiment, the method comprises halting operation of the crossing gate arm in response to a detected obstruction. Further, the method may comprise generating an error code in response to a detected obstruction.

While the method is described as a series of acts or steps that are performed in a sequence, it is to be understood that the method may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

Further, a non-transitory computer readable medium storing executable instructions, which, when executed by a computer, perform the method for detecting an obstruction of a railroad crossing gate as described is provided.

As noted, by utilizing sensing information of sensor(s) of the electric motor that is operating the gate arm, hardware of the controller does not have to reach its thermal or electrical design limits (for example over-current condition) to determine that an obstruction has been encountered. Rather, the motion of the gate arm is sensed by the sensor(s) on the electric motor. This provides a responsive method for knowing when the gate arm has stopped moving or has reversed direction. Command(s) to rotate the electric motor and thereby move the gate arm is provided and controlled by the same firmware, e.g. controller 300, and as a result the firmware can responsively determine that an obstruction has been encountered when an elevated command has been reached and the gate arm motion has either ceased or reversed direction.

The invention claimed is:

1. A crossing gate mechanism comprising:
  an electric motor with at least one sensing device,
  a crossing gate arm operated via the electric motor,
  a controller configured to control the electric motor to raise or lower the crossing gate arm in response to a gate control signal,
  wherein the controller is further configured to
    sense a motion of the crossing gate arm,
    detect an obstruction that prevents the crossing gate arm to execute the motion, and
  wherein the electric motor is an electric brushless direct current (BLDC) motor.

2. The crossing gate mechanism of claim 1,
  wherein the controller is configured to sense the motion of the crossing gate arm utilizing sensor information of the at least one sensing device on the electric motor.

3. The crossing gate mechanism of claim 2,
  wherein the controller is configured to determine that a direction of the crossing gate arm has changed.

4. The crossing gate mechanism of claim 2,
  wherein the controller is configured to determine that a speed or velocity of the crossing gate arm has changed.

5. The crossing gate mechanism of claim 1,
wherein the controller is configured to halt operation of the crossing gate arm in response to a detected obstruction.

6. The crossing gate mechanism of claim 1,
wherein the controller is configured to generate an error code in response to a detected obstruction.

7. A crossing gate mechanism comprising:
an electric motor with at least one sensing device,
a crossing gate arm operated via the electric motor,
a controller configured to control the electric motor to raise or lower the crossing gate arm in response to a gate control signal,
wherein the controller is further configured to
sense a motion of the crossing gate arm,
detect an obstruction that prevents the crossing gate arm to execute the motion, and
wherein the at least one sensing device comprises one or more Hall effect sensor(s).

8. A crossing gate mechanism comprising:
an electric motor with at least one sensing device,
a crossing gate arm operated via the electric motor,
a controller configured to control the electric motor to raise or lower the crossing gate arm in response to a gate control signal,
wherein the controller is further configured to
sense a motion of the crossing gate arm,
detect an obstruction that prevents the crossing gate arm to execute the motion, and
wherein the controller is implemented as a field-programmable gate array (FPGA), in a real-time central processing unit (CPU), an application-specific integrated circuit (ASIC), a complex programmable logic device (CPLD) or a system-on-chip (SoC).

9. A method for detecting an obstruction of a railroad crossing gate, the method comprising:
initiating a defined motion of a crossing gate arm of a railroad crossing gate, the crossing gate arm being operated via an electric motor,
sensing the defined motion of the crossing gate arm, and
detecting an obstruction of the crossing gate arm when the crossing gate arm fails to execute the defined motion, and further comprising
receiving sensor information from at least one sensing device of the electric motor, wherein the at least one sensing device comprises one or more Hall effect sensor(s).

10. The method of claim 9,
wherein the defined motion includes a direction and speed of the crossing gate arm.

11. The method of claim 10,
wherein determining the obstruction includes determining a change in the direction.

12. The method of claim 10,
wherein determining the obstruction includes determining a change in the speed or velocity.

13. The method of claim 9, further comprising:
halting operation of the crossing gate arm in response to a detected obstruction.

14. The method of claim 9, further comprising:
generating an error code in response to a detected obstruction.

15. A non-transitory computer readable medium storing executable instructions, which, when executed by a computer, perform a method for detecting an obstruction of a railroad crossing gate as claimed in claim 9.

* * * * *